United States Patent
Ma et al.

(10) Patent No.: US 11,995,827 B2
(45) Date of Patent: May 28, 2024

(54) IMAGE DISPLAY METHOD AND APPARATUS FOR DETECTING ABNORMAL OBJECT BASED ON ARTIFICIAL INTELLIGENCE, DEVICE, AND MEDIUM

(71) Applicant: TENCENT TECHNOLOGY (SHENZHEN) COMPANY LIMITED, Shenzhen (CN)

(72) Inventors: Zhaoxuan Ma, Shenzhen (CN); De Cai, Shenzhen (CN); Hu Ye, Shenzhen (CN); Xiao Han, Shenzhen (CN); Yanqing Kong, Shenzhen (CN); Hongping Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 148 days.

(21) Appl. No.: 17/718,224

(22) Filed: Apr. 11, 2022

(65) Prior Publication Data
US 2022/0237790 A1 Jul. 28, 2022

Related U.S. Application Data

(63) Continuation of application No. PCT/CN2021/080603, filed on Mar. 12, 2021.

(30) Foreign Application Priority Data

Apr. 22, 2020 (CN) .......................... 202010320738.1

(51) Int. Cl.
G06T 7/00 (2017.01)
G06T 11/00 (2006.01)
(Continued)

(52) U.S. Cl.
CPC ............ *G06T 7/0012* (2013.01); *G06T 11/00* (2013.01); *G06V 10/75* (2022.01); *G06V 10/764* (2022.01);
(Continued)

(58) Field of Classification Search
None
See application file for complete search history.

(56) References Cited

U.S. PATENT DOCUMENTS 6,430,309 B1 * 8/2002 Pressman ............... G06V 20/69
128/920
2004/0131241 A1 * 7/2004 Curry .................... G06V 10/24
382/133
(Continued)

FOREIGN PATENT DOCUMENTS

CN 102682305 B 7/2014
CN 106530320 A 3/2017
(Continued)

OTHER PUBLICATIONS

The World Intellectual Property Organization (WIPO) International Search Report for PCT/CN2021/080603 dated Jun. 1, 2021 5 Pages (including translation).

(Continued)

*Primary Examiner* — Jason A Pringle-Parker
(74) *Attorney, Agent, or Firm* — ANOVA LAW GROUP, PLLC

(57) ABSTRACT

An image display method includes: processing a first image to obtain a first feature image, the first image being an image of a local area of a smear captured by a microscope, and the local area including multiple objects to be tested; obtaining a second feature image corresponding to the first feature image, the second feature image and the first feature image having a same size; obtaining a third feature image accord- (Continued)

ing to an image obtained by overlaying the first feature image and the second feature image, a feature point in the third feature image indicating a possibility that one of the multiple objects is an abnormal object; obtaining a second image according to the third feature image; and displaying the second image superimposed on the first image.

18 Claims, 8 Drawing Sheets

(51) Int. Cl.
  *G06V 10/75* (2022.01)
  *G06V 10/764* (2022.01)
  *G06V 20/69* (2022.01)
(52) U.S. Cl.
  CPC .. *G06V 20/695* (2022.01); *G06T 2207/30024* (2013.01); *G06T 2207/30096* (2013.01); *G06T 2210/41* (2013.01)

(56) References Cited

U.S. PATENT DOCUMENTS

| | | | | |
|---|---|---|---|---|
| 2012/0149049 | A1* | 6/2012 | Torres | G06V 20/695 |
| | | | | 435/287.1 |
| 2014/0168256 | A1* | 6/2014 | Miyama | H04N 1/3935 |
| | | | | 345/625 |
| 2016/0035093 | A1* | 2/2016 | Kateb | G02B 21/0012 |
| | | | | 382/131 |
| 2017/0091528 | A1* | 3/2017 | Savvides | G06V 20/698 |
| 2017/0220000 | A1* | 8/2017 | Ozcan | H04N 23/698 |
| 2018/0322327 | A1 | 11/2018 | Smith et al. | |
| 2020/0097727 | A1* | 3/2020 | Stumpe | G02B 21/361 |
| 2021/0090248 | A1* | 3/2021 | Choi | G06N 3/08 |
| 2021/0279503 | A1 | 9/2021 | Qi et al. | |

FOREIGN PATENT DOCUMENTS

| | | |
|---|---|---|
| CN | 106991673 A | 7/2017 |
| CN | 107256558 A | 10/2017 |
| CN | 103984958 B | 11/2017 |
| CN | 108765422 A | 11/2018 |
| CN | 109342369 A | 2/2019 |
| CN | 109389051 A | 2/2019 |
| CN | 110021022 A | 7/2019 |
| CN | 110070056 A | 7/2019 |
| CN | 110322495 A | 10/2019 |
| CN | 110458127 A | 11/2019 |
| CN | 110647874 A | 1/2020 |
| CN | 110796199 A | 2/2020 |
| CN | 111046962 A | 4/2020 |
| CN | 111598133 A | 8/2020 |

OTHER PUBLICATIONS

China National Intellectual Property Administration (CNIPA) Office Action 1 for 202010320738.1 dated May 20, 2022 16 Pages (including translation).

Du Wang, "Intelligent Analysis Algorithm Research on Digital Pathology Images Based on Deep Learning," China Excellent Master's Thesis Full-text Database Medical and Health Science and Technology Series, Jan. 15, 2020 (Jan. 15, 2020). 86 pages.

Liang Chen et al., "Fully automatic acute ischemic lesion segmentation in DWI using convolutional neural networks," NeuroImage: Clinical, Dec. 31, 2017 (Dec. 31, 2017), pp. 633-643. 11 pages.

* cited by examiner

IMAGE DISPLAY METHOD AND APPARATUS FOR DETECTING ABNORMAL OBJECT BASED ON ARTIFICIAL INTELLIGENCE, DEVICE, AND MEDIUM

CROSS-REFERENCES TO RELATED APPLICATIONS

This application is a continuation application of PCT Patent Application No. PCT/CN2021/080603, entitled "IMAGE DISPLAY METHOD AND APPARATUS BASED ON ARTIFICIAL INTELLIGENCE, AND DEVICE AND MEDIUM" and filed on Mar. 12, 2021, which claims priority to Chinese Patent Application No. 202010320738.1, entitled "IMAGE DISPLAY METHOD AND APPARATUS BASED ON ARTIFICIAL INTELLIGENCE, DEVICE, AND MEDIUM" and filed with the China National Intellectual Property Administration on Apr. 22, 2020, the entire contents of both of which are incorporated herein by reference.

FIELD OF THE TECHNOLOGY

The present disclosure relates to the field of artificial intelligence technologies, and in particular, to an image display method and apparatus based on artificial intelligence, a device, and a medium.

BACKGROUND OF THE DISCLOSURE

Cervical cancer is a malignant tumor disease with a serious threat to women and a high mortality rate. As screening methods of cervical cancer are developed, a cervical cancer lesion can be successfully found at an early disease stage through the thin-layer liquid-based cytology technique, to reduce an incidence rate and a mortality rate. However, in a screening process, a medical practitioner needs to make a judgment on a cervical liquid-based smear based on personal experience, to determine whether a lesion is present. As a result, when the medical practitioner is subject to a high workload, the problem of misdiagnosis and missed diagnosis easily occurs.

Currently, the workload of a medical practitioner can be reduced in a computer-assisted manner. That is, in a screening process, a computer device comprehensively scans a cervical liquid-based smear, segments, through an image processing technology, an image obtained through scanning, extracts a cell image therein, and determines whether a lesion is present in a cell according to a cell feature.

The foregoing technical solution has the following problem: Costs of the device for scanning the smear are high. Smear scanning consumes a very long time. Besides, because the cell image is complex and nucleuses may overlap or may be in contact with each other, the computer device cannot make an accurate judgment on the image obtained through scanning, and the medical practitioner still needs to make a judgment again to complete the screening. Consequently, this reduces screening efficiency of doctors.

SUMMARY

Embodiments of the present disclosure provide an image display method and apparatus based on artificial intelligence, a device, and a medium. The technical solutions are as follows:

According to one aspect, an image display method based on artificial intelligence is provided, executed by a computer device. The method includes: processing a first image to obtain a first feature image, the first image being an image of a local area of a smear captured by a microscope, and the local area including multiple objects to be tested; obtaining a second feature image corresponding to the first feature image, the second feature image and the first feature image having a same size; obtaining a third feature image according to an image obtained by overlaying the first feature image and the second feature image, a feature point in the third feature image indicating a possibility that one of the multiple objects is an abnormal object; obtaining a second image according to the third feature image; and displaying the second image superimposed on the first image According to another aspect, an image display apparatus based on artificial intelligence is provided. The apparatus includes: a memory and a processor coupled to the memory. The processor is configured to: process a first image to obtain a first feature image, the first image being an image of a local area of a smear captured by a microscope, and the local area including multiple objects to be tested; obtain a second feature image corresponding to the first feature image, the second feature image and the first feature image having a same size; obtain a third feature image according to an image obtained by overlaying the first feature image and the second feature image, a feature point in the third feature image indicating a possibility that one of the multiple objects is an abnormal object; obtain a second image according to the third feature image; and display the second image superimposed on the first image. According to another aspect, an image display system based on artificial intelligence is provided, the system including: an objective lens, an ocular lens, an image capturing component, an image processing component, and an augmented reality component. The objective lens is configured to magnify a local area of a smear, the local area including multiple objects to be tested. The image capturing component is connected to the objective lens and configured to capture a first image through a microscope, the first image being an image of the local area of the smear. The image processing component is connected to the image capturing component and configured to: process the first image, to obtain a first feature image; obtain, according to the first feature image, a second feature image corresponding to the first feature image, the second feature image and the first feature image having the same size; obtain a third feature image according to an image obtained by overlaying the first feature image and the second feature image, a feature point in the third feature image indicating a possibility that one of the multiple objects to be tested is an abnormal object; obtain a second image according to the third feature image, the second image be indicating a location of an abnormal object in the first image. The ocular lens is connected to the image capturing component and configured to display the first image. The augmented reality component is connected to the image processing component and configured to project the second image into the ocular lens, so that the ocular lens displays the second image superimposed on the first image.

According to another aspect, a non-transitory storage medium is provided, the storage medium storing at least one computer program, and the at least one computer program, when executed by a processor, causes the processor to perform: processing a first image to obtain a first feature image, the first image being an image of a local area of a smear captured by a microscope, and the local area including multiple objects to be tested; obtaining a second feature image corresponding to the first feature image, the second feature image and the first feature image having a same size;

obtaining a third feature image according to an image obtained by overlaying the first feature image and the second feature image, a feature point in the third feature image indicating a possibility that one of the multiple objects is an abnormal object; obtaining a second image according to the third feature image; and displaying the second image superimposed on the first image.

DESCRIPTION OF EMBODIMENTS

Figure 1:
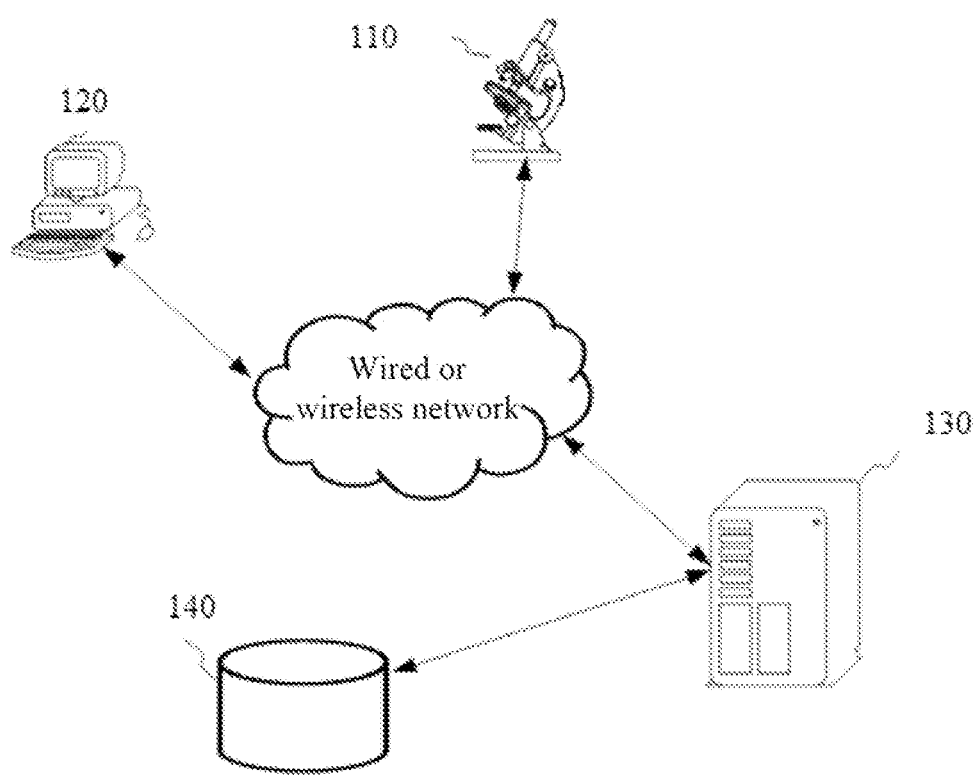
FIG. 1 is a structural block diagram of an image display system based on artificial intelligence according to an embodiment of the application.

The following briefly describes technologies that may be used in the embodiments of the present disclosure:

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

Machine Learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

TCT is short for thinprep cytologic test. In TCT, a liquid-based thin-layer cell test system tests cervical cells and performs cytologic classification diagnosis. TCT is a more advanced cytologic test technology of cervical cancer in the world. Compared with the conventional cervical Pap smear test, TCT significantly improves satisfaction of a specimen and the detection rate of an abnormal cervical cell.

The embodiments of the present disclosure provide an image display method based on artificial intelligence. The method may be applied to a scenario in which a medical practitioner observes a smear with a microscope based on artificial intelligence. For example, the smear may be various cervical liquid-based smears (for example, a sedimentation smear, a membrane-based smear, and a cell smear) produced based on the thin-layer liquid-based cytologic technique. When performing pathological test, a medical practitioner may observe a produced smear with a microscope based on artificial intelligence, to determine whether a lesion is present.

The following describes an implementation environment of the image display method based on artificial intelligence. FIG. 1 is a structural block diagram of an image display system 100 based on artificial intelligence according to an embodiment of the application. The image display system based on artificial intelligence may include: a microscope 110 based on artificial intelligence and a computer device 120. In some embodiments, the system further includes a server 130 and a database 140.

The microscope 110 may be an electronic microscope integrated with an image capturing component. The electronic microscope is provided with an image output interface, configured to transmit a captured microscopic image to the computer device 120 or the server 120. The image output interface may be a wired interface, such as a universal serial bus (USB) interface, a high definition multimedia interface (HDMI), or an Ethernet interface. Alternatively, the image output interface may be a wireless interface, such as a wireless local area network (WLAN) interface or a Bluetooth interface. Correspondingly, as the type of the image output interface varies, the microscopic image may be transmitted in multiple manners. For example, the captured microscopic image is transmitted to the computer device 120 in a wired manner or a wireless short distance manner, or the computer device 120 sends the received microscopic image to the server 130, or the captured microscopic image is transmitted to the computer device 120 or the server 130 through a local area network or Internet.

The computer device 120 may be a smartphone, a tablet computer, a notebook computer, a desktop computer, a smart watch, or the like, but is not limited thereto. An application program for processing the obtained microscopic image may be installed and run on the computer device 120. After obtaining the microscopic image, the computer device 120 may process the microscopic image through the application program and send a processing result to the microscope 110, and the microscope 110 displays the processing result in the ocular lens.

In the system shown in FIG. 1, the computer device 120 and the microscope 110 are physical devices that are physically separated from each other. In one embodiment, the computer device 120 and the microscope 110 may be integrated into a single physically device. For example, the microscope 110 may be an intelligent microscope with a computing function of the computer device 120.

Figure 2:
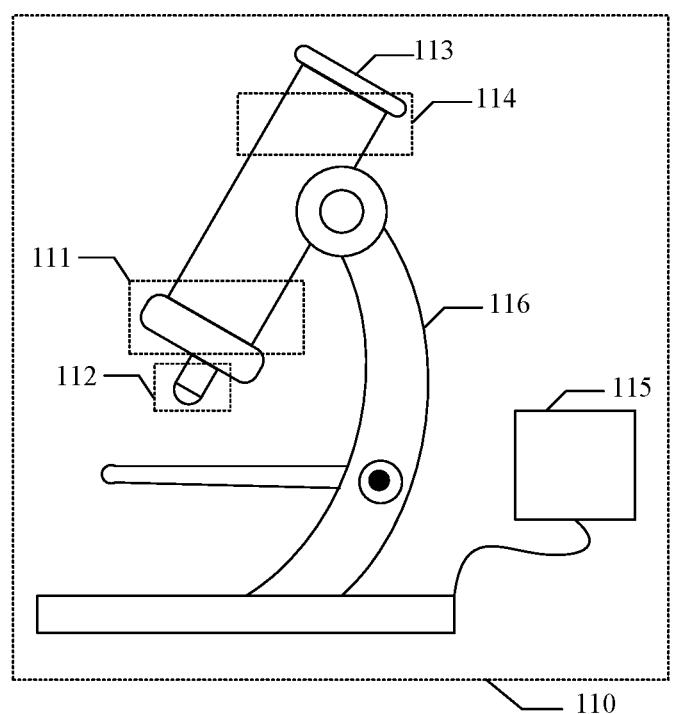
FIG. 2 is a schematic structural diagram of a microscope based on artificial intelligence according to an embodiment of the present disclosure.

For example, FIG. 2 is a schematic structural diagram of a microscope based on artificial intelligence according to an embodiment of the present disclosure. As shown in FIG. 2, the microscope 110 is applied to the image display system based on artificial intelligence shown in FIG. 1. The microscope 110 may include an image capturing component 111, an objective lens 112, an ocular lens 113, an augmented reality component 114, and an image processing component 115. In some embodiments, the microscope 110 may further include a microscope body 116 or the like.

The objective lens 112 is configured to magnify a local area of a smear including multiple to-be-tested objects. The image capturing component 111 is connected to the objective lens 112 and is configured to obtain a first image, the first image being an image obtained by capturing an image of the local area of the smear including multiple to-be-tested objects. The image processing component 115 is connected to the image capturing component 111 and is configured to process the first image, to obtain a first feature image. The image processing component 115 is further configured to obtain, according to the first feature image, a second feature image corresponding to the first feature image, the second feature image and the first feature image having the same size. The image processing component 115 is further configured to obtain a third feature image according to an image obtained by overlaying the first feature image and the second feature image, a feature point in the third feature image indicating a possibility that one of the multiple objects to be tested is an abnormal object. The image processing component 115 is further configured to obtain a second image according to the third feature image, the second image indicating a location of an abnormal object in the first image. The ocular lens 113 is connected to the image capturing component 111 and is configured to display the first image captured by the image capturing component 111. The augmented reality component 114 is connected to the image processing component 115 and is configured to project the second image into the ocular lens 113 based on the augmented reality (AR) technology, so that the ocular lens 113 displays the second image superimposed on the first image. The microscope body 116 is configured to provide physical support for the foregoing components, including structure support, energy support, and the like. The microscope 110 may further include another functional component. This is not limited in the embodiments of the present disclosure.

The server 130 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

The computer device 120 and the server 130 may be directly or indirectly connected in a wired or wireless communication manner. This is not limited in the embodiments of the present disclosure.

The server 130 is configured to provide the computer device 120 with a service of processing the microscopic image. In some embodiments, the server 130 is responsible for performing primary processing on a microscopic image, and the computer device 120 is responsible for performing secondary processing on a microscopic image. Alternatively, the server 130 is responsible for performing secondary processing on a microscopic image, and the computer device 120 is responsible for performing primary processing on a microscopic image. Alternatively, the server 130 or the computer device 120 may separately process a microscopic image.

The database 140 may be a Redis database or another type of database. The database 140 is configured to store various types of data.

In some embodiments, a standard communication technology and/or protocol is used for the wireless network or the wired network described above. The network is generally the Internet, but may be any network, including, but not limited to, any combination of a local area network (LAN), a metropolitan area network (MAN), a wide area network (WAN), a mobile, wired, or wireless network, and a dedicated network or a virtual private network. In some embodiments, technologies and/or formats such as the Hyper Text Markup Language (HTML) and the extensible markup language (XML) are used for representing data exchanged through the network. In addition, all or some links may be encrypted by using conventional encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

Figure 3:
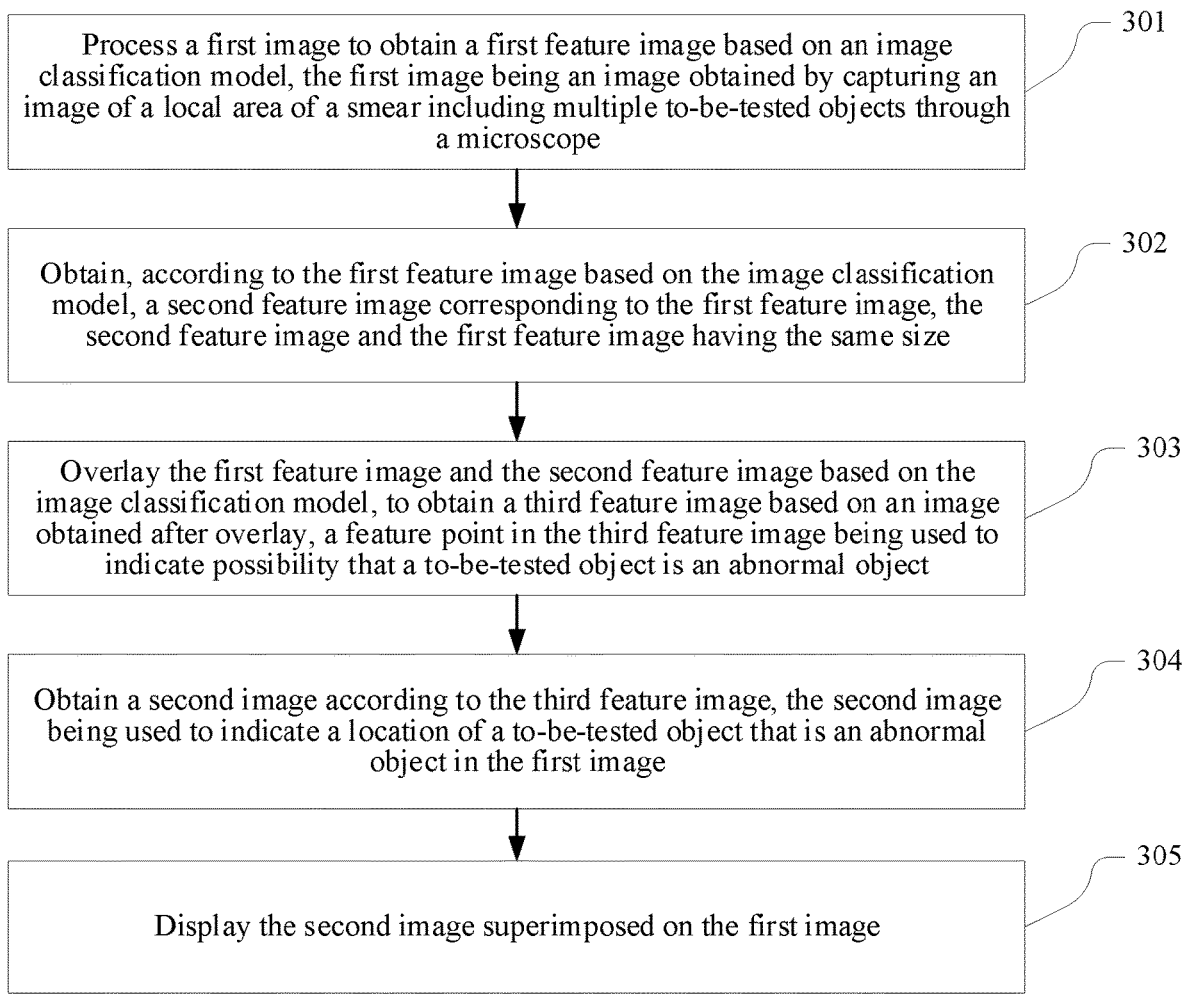
FIG. 3 is a flowchart of an image display method based on artificial intelligence according to an embodiment of the present disclosure.

FIG. 3 is a flowchart of an image display method based on artificial intelligence according to an embodiment of the present disclosure. The image display method may be performed by a computer device. The computer device may be a single device and is integrated with a microscopic function. Alternatively, the computer device may be a set of multiple devices. For example, the computer device may include the microscope 110 in the system shown in FIG. 1, that is, the method may be performed through interaction between the microscope 110 and the computer device 120 in the system shown in FIG. 1. As shown in FIG. 3, the image display method based on artificial intelligence includes the following steps:

301. Process a first image to obtain a first feature image based on an image classification model, the first image being an image obtained by capturing an image of a local area of a smear including multiple to-be-tested objects through a microscope.

Step 301 is one embodiment of processing the first image to obtain the first feature image. In this implementation, the process of processing the first image to obtain the first feature image is implemented based on the image classification model. In another embodiment, the first image may be alternatively processed in another manner rather than based on the image classification model. For example, the first image is processed to obtain the first feature image directly through an image processing script. This is not limited in this embodiment of the present disclosure.

In this embodiment of the present disclosure, the smear is a smear placed on an objective lens stage of the microscope. The microscope may magnify the local area of the smear through the objective lens, and then capture a magnified microscopic image through an image capturing component and use the captured image as the first image. For example, the smear may be a cervical liquid-based smear or another smear produced based on the thin-layer liquid-based cytologic technique. The image classification model may be a model obtained based on machine learning and include an already trained neural network, and convolution processing may be performed on the first image to obtain the first feature image based on the already trained neural network. That is, multiple layers of neural network convolution structures may be used as the image classification model, and the image classification model includes multiple convolution layers. The first image may be inputted into the image classification model, and a convolution layer in the image classification model performs convolution processing on the first image, to obtain the first feature image.

302. Obtain, according to the first feature image based on the image classification model, a second feature image corresponding to the first feature image, the second feature image and the first feature image having the same size.

Step 302 is one embodiment of obtaining the second feature image corresponding to the first feature image. In this implementation, the process of obtaining the second feature image corresponding to the first feature image is implemented based on the image classification model. In another embodiment, the first feature image may be processed to obtain the second feature image in another manner rather than based on the image classification model. For example, the first feature image is processed to obtain the second feature image directly through an image processing script. This is not limited in this embodiment of the present disclosure.

In this embodiment of the present disclosure, convolution and deconvolution processing may be performed on the first feature image based on the image classification model, to obtain the second feature image having the same size as the first feature image. The image classification model may include a trained neural network, that is, multiple layers of neural network convolution structures may be used as the image classification model, and the image classification model includes multiple convolution layers. In step 302, after the first image is processed to obtain the first feature image based on the image classification model, the convolution layer in the image classification model may further perform convolution and deconvolution processing on the first feature image to obtain the second feature image.

303. Overlay the first feature image and the second feature image based on the image classification model, to obtain a third feature image based on an image obtained after overlay, a feature point in the third feature image indicating a possibility that one of the multiple objects to be tested is an abnormal object.

Step 303 is one embodiment of overlaying the first feature image and the second feature image, to obtain the third feature image based on the image obtained after overlay. In this implementation, the process of overlaying the two feature images to obtain the third feature image based on the image obtained after overlay is implemented based on the image classification model. In another embodiment, the first feature image, the second feature image, and the image obtained after overlay may be processed to obtain the third feature image in another manner rather than based on the image classification model. For example, the first feature image and the second feature image are overlaid directly through an image processing script, to obtain the third feature image based on the image obtained after overlay. This is not limited in this embodiment of the present disclosure.

In this embodiment of the present disclosure, the first feature image and the second feature image that have the same size may be overlaid to obtain a new image based on the image classification model, and the new image obtained after overlay and the two feature images that are not overlaid have the same size. Convolution processing may be performed on the new image obtained after overlay, to obtain the third feature image. A feature value of each feature point in the third feature image indicates possibility that a to-be-tested object is an abnormal object. The higher possibility indicates a larger feature value.

In some embodiments, the image classification model may include a trained neural network, that is, multiple layers of neural network convolution structures may be used as the image classification model, and the image classification model includes multiple convolution layers. In step 303, after the first feature image and the second feature image are obtained, the two feature images may be overlaid based on the image classification model, and then the convolution layer in the image classification model performs convolution processing on the new image obtained after overlay, to obtain the third feature image.

304. Obtain a second image according to the third feature image, the second image indicating a location of an abnormal object in the first image.

In this embodiment of the present disclosure, a location of an abnormal object may be obtained based on the obtained third feature image, to obtain the second image indicating the location of the abnormal object.

305. Display the second image superimposed on the first image.

In this embodiment of the present disclosure, an augmented reality component of the microscope may output the first image and the second image to the ocular lens of the microscope for display. In this way, the medical practitioner may observe, while observing the first image through the ocular lens, the second image displayed through overlay. Therefore, the location of the abnormal object is identified for the medical practitioner.

In this embodiment of the present disclosure, the microscope captures an image of the local area of the smear, then the captured first image is processed based on the image classification model, the first feature image obtained through processing and the corresponding second feature image are overlaid, the third feature image in which a feature point indicates the possibility that a to-be-tested object is an abnormal object is outputted based on the image obtained after overlay, then the second image that indicates the location of the abnormal object in the first image is obtained based on the third feature image, and finally the second image is displayed by overlaying the second image on the first image. In this way, when interpreting the smear, the medical practitioner may make a judgment in real time when the local area of the smear includes the abnormal object. The medical practitioner does not need to confirm again. This shortens the working procedure of the medical practitioner and improves screening efficiency.

Figure 4:
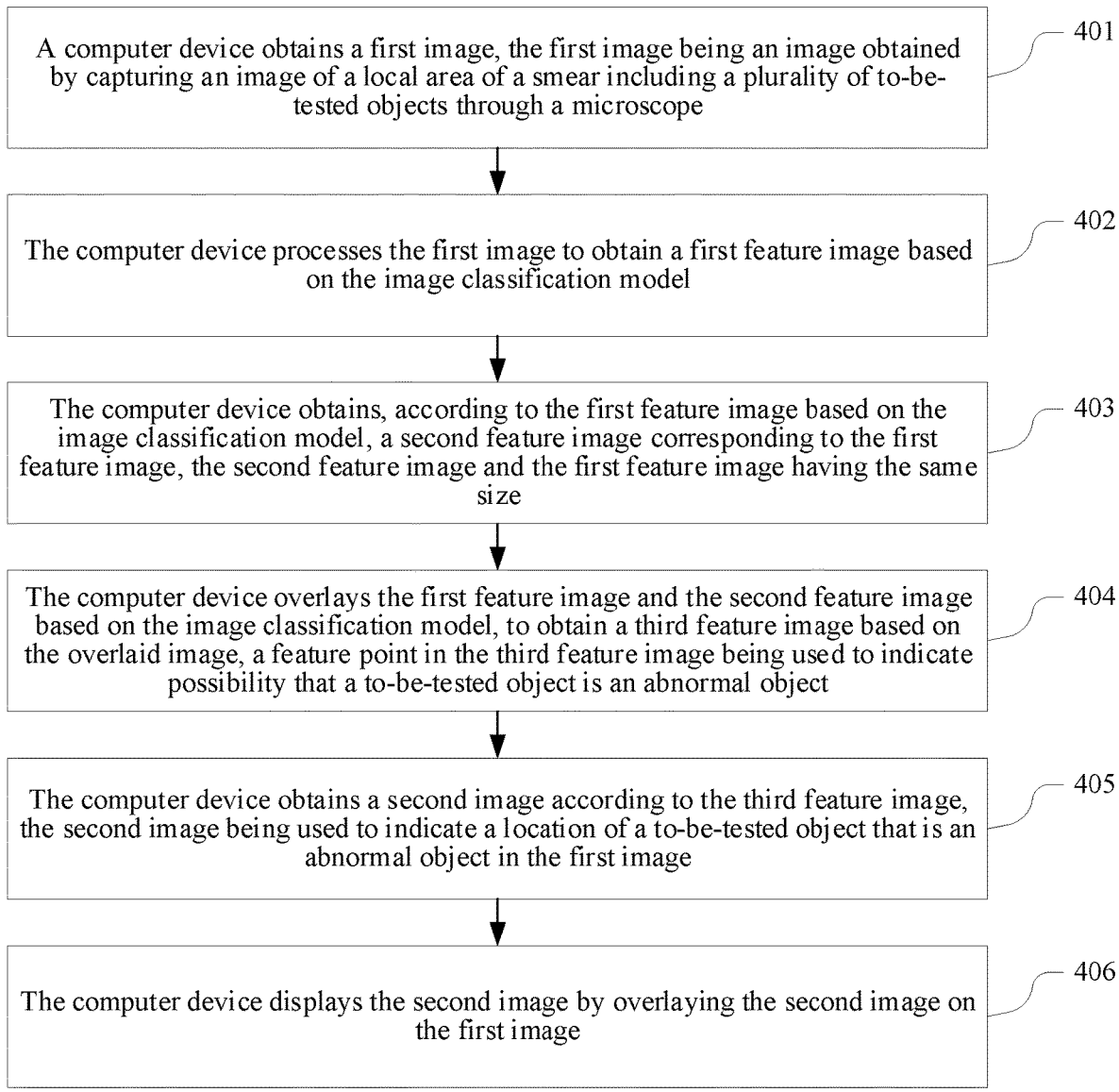
FIG. 4 is a flowchart of another image display method based on artificial intelligence according to an embodiment of the present disclosure.

FIG. 4 is a flowchart of another image display method based on artificial intelligence according to an embodiment of the present disclosure. As shown in FIG. 4, in this embodiment of the present disclosure, a computer device is used as an example, and the computer device may be a terminal or a server. As can be seen from the embodiment shown in FIG. 3, some steps in the image display method based on artificial intelligence may be performed based on the image classification model. In the embodiment shown in FIG. 4, only the example of performing these steps based on the image classification model is used, but these steps are not limited to this implementation. The image display method based on artificial intelligence includes the following steps:

401. A computer device obtains a first image, the first image being an image obtained by capturing an image of a local area of a smear including multiple to-be-tested objects through a microscope.

In this embodiment of the present disclosure, the microscope has a particular field of view range, and may cover the local area of the smear. The location of the smear may be moved, to change an area of the smear in the current field of view of the microscope. The microscope may magnify the area of the smear in the current field of view through the objective lens. The computer device may capture an image of the magnified area of the smear through the image capturing component, and use the captured microscopic image as the first image. The first image is consistent with the local area of the smear observed by a medical practitioner through the ocular lens of the microscope. As the power of the objective lens used by the microscope to capture an image varies, the magnification power of the captured first image is different.

When the computer device detects that the location of the smear moves, or when the microscope is switched from the current objective lens to an objective lens with another power, the computer device may capture an image again through the image capturing component, to obtain a new microscopic image. The new microscopic image is inconsistent with an area of the smear corresponding to the first image captured before the location of the smear moves, or a magnification power of the new microscopic image is different from that of a first microscopic image captured before the objective lens is switched.

The computer device may process the obtained first image by invoking the image classification model.

In one embodiment, the computer device may obtain an image attribute of the first image before invoking the image classification model, and obtain a corresponding image classification model based on the image attribute. The image attribute may be used to indicate a pathological analysis type of the first image. The computer device may invoke, according to the pathological analysis type, an image classification model corresponding to the pathological analysis type. That is, after obtaining the pathological analysis type of the first image, the computer device may invoke the image classification model corresponding to the pathological analysis type. In some embodiments, one pathological analysis type may correspond to at least one image classification model, and image classification models are different from each other in that magnification powers of sample images used for training are different. The computer device may select an image classification model whose corresponding magnification power is the same as the target magnification power from the at least one image classification model according to the target magnification power used when the first image is captured. The image classification model is invoked based on the image attribute of the first image, and various image classification models corresponding to different objective lens powers are set. Therefore, application in various pathological analysis scenarios may be implemented and the application scope is increased.

For example, the first image is an image obtained by capturing an image of a cervical liquid-based smear. The computer device obtains the pathological analysis type of the first image as a cervical cancer analysis type, and then invokes an image classification model for analyzing positive cells of cervical cancer.

402. The computer device processes the first image to obtain a first feature image based on the image classification model.

In this embodiment of the present disclosure, the computer device may perform convolution processing on the first image through an already trained neural network in the image classification model, to obtain the first feature image.

In one embodiment, training steps of the image classification model may be as follows: The computer device obtains a training sample image, and obtains a training target image according to the training sample image. The training sample image is an image in which a location of an abnormal object is marked, and the training target image is a binary image and is used to indicate the abnormal object. The computer device may input the training sample image to an image classification model to be trained, to obtain a first sample feature image outputted by the to-be-trained image classification model. The computer device then performs parameter adjustment according to the first sample feature image and the training target image. In response to that a training end condition is satisfied, the computer device may use a model obtained through training as the image classification model. When the image classification model is a model for classifying positive cells, the training sample image may be an image including positive cells and negative cells at different ratios. For example, ratios of positive cells to negative cells are 5:1, 3:1, and 2:1. The training end condition may be: reaching a target quantity of training times, or the model converges, or the like. This is not limited in this embodiment of the present disclosure. The target quantity of training times may be set by a relevant technical person according to the requirement. This is not limited in this embodiment of the present disclosure. In some embodiments, to increase the recall ratio of the training sample image including positive cells, the computer device may increase the loss weight of the training sample image including positive cells when training the image classification model. Because the image classification model is trained according to the characteristic of cancer lesion cell screening with reference to the captured training sample image, the image classification model may be effectively trained to identify positive cells.

In one embodiment, the location of an abnormal object in the training sample image may be marked by a professional, for example, a medical expert marks the location of a positive cell. Correspondingly, the computer device may obtain the training target image according to the training sample image in the following step: the computer device performs value conversion on the training sample image, to obtain a two-channel training target image. The training target image is a binary image. Value conversion steps may be: the computer device uses an area marked in the training sample image as a target area, sets a pixel value of a target area to 1 and sets a pixel value of a non-target area to 0 as a channel of the training target image, and sets the pixel value of the target area to 0 and sets the pixel value of the non-target area to 1 as another channel of the training target image. The binary training target image is obtained, so that the training target image may be used as a label to train the image classification model under supervision. In this way, the model obtained through training may output an image that is similar to the training target image.

In one embodiment, when convolution processing is performed on the first image based on the image classification model, the size of an image outputted by each convolution layer may be half the size of an image inputted to the convolution layer. The computer device may obtain the quantity of convolution layers of the image classification model according to the target scaling ratio. The target scaling ratio is used to indicate a ratio between the first sample feature image and the training sample image. Correspondingly, the computer device may obtain the quantity of convolution layers of the image classification model in the following steps: The computer device may obtain a target size according to an image attribute of the training sample image, where the target size is used to indicate an actual size represented by a pixel in the training sample image. Then, the computer device may obtain the target scaling ratio according to the target size and a reference cell size. The computer device obtains the quantity of convolution layers of the image classification model according to the target scaling ratio. The reference cell size may be the size of a small squamous cell, or the size of a cell in other base liquid. This is not limited in the embodiments of the present disclosure. The actual size is an actual size represented by a pixel, that is, the size that is not magnified. The computer device may obtain the target size according to the image attribute of the training sample image in the following steps: the computer device may obtain the image attribute of the training sample image, obtain a sample magnification power used when the training sample image is captured and a pixel size that exists when the training sample image is captured, and then obtain the target size according to the sample magnification power and the pixel size. For example, the magnification power is 10 and the diameter of a squamous cell is 10 microns. In this case, the diameter of a magnified squamous cell in the training sample image is 100 microns. If the pixel size that exists when the training sample image is captured by the image capturing component is 50 microns, about 4 pixels in the training sample image cover a squamous cell. Because the actual diameter of a squamous cell is 10 microns, the actual size of a pixel in the training sample image is 5 microns, that is, the target size is 5 microns. Because the target scaling ratio is obtained based on the reference cell size and the pixel size of each pixel in the training sample image, each cell in the first sample feature image may be covered by at least one pixel. More pixels each of which covers one cell indicate the higher resolution of the second image and the clearer cell image.

For example, the pixel size of each pixel in the training sample image is 824 microns, and the reference cell size is the size of a squamous cell. The size of a small squamous cell, that is, the diameter, is between 10 microns and 20 microns. For example, the reference cell size is set to 10 microns. To reach the objective that one pixel covers one squamous cell, when the magnification power of the microscope is 10, the target size is 82.4 microns, and the target scaling ratio is 82.4/10 and is about 8. To reach the objective that four pixels cover one squamous cell, the target scaling ratio may be (82.4×2)/10 and is about 16.

403. The computer device obtains, according to the first feature image based on the image classification model, a second feature image corresponding to the first feature image, the second feature image and the first feature image having the same size.

In this embodiment of the present disclosure, after performing convolution processing on the first feature image, the computer device may perform deconvolution processing on the first feature image, to obtain the second feature image. Correspondingly, the computer device may obtain the second feature image in the following steps: The computer device may perform convolution processing on the first feature image based on the image classification model, to obtain a fourth feature image; and then perform deconvolution processing on the fourth feature image based on the image classification model, to obtain the second feature image corresponding to the first feature image. The first feature image and the second feature image have the same size and different quantities of channels.

Alternatively, after performing convolution processing on the first feature image, the computer device may perform up-sampling processing to obtain the second feature image. This is not limited in the embodiments of the present disclosure.

404. The computer device overlays the first feature image and the second feature image based on the image classification model, to obtain a third feature image based on an image obtained after overlay, a feature point in the third feature image indicating a possibility that one of the multiple objects to be tested is an abnormal object.

In this embodiment of the present disclosure, the computer device may overlay the first feature image and the second feature image based on the image classification model, to obtain a fifth feature image, where the fifth feature image and the first feature image have the same size and the fifth feature image and the second feature image also have the same size, and channels of the fifth feature image include channels of the first feature image and channels of the second feature image. The computer device may perform convolution processing on the fifth feature image based on the image classification model, to obtain the third feature image. The third feature image is a binary image, a pixel point in the image is a feature point, and a feature value of each feature point is between 0 and 1 and is used to indicate possibility that a to-be-tested object is an abnormal object. The third feature image includes two channels, and one channel is a negative value channel and the other channel is a positive value channel. In the positive value channel, if possibility that a to-be-tested object is an abnormal object is higher, a value of a feature point corresponding to the to-be-tested object is closer 1, and otherwise, is closer to 0. In the negative value channel, if possibility that a to-be-tested object is an abnormal object is higher, a value of a feature point corresponding to the to-be-tested object is closer 0, and otherwise, is closer to 1. The pixel value of each pixel in the third feature image is between 0 and 1, which is similar to a thermodynamic diagram. Therefore, the third feature image may also be referred to as a two-channel thermodynamic diagram.

405. The computer device obtains a second image according to the third feature image, the second image indicating a location of an abnormal object in the first image.

In this embodiment of the present disclosure, after obtaining the third feature image, the computer device may obtain a target channel image in the third feature image. A feature value of each feature point in the target channel image is between 0 and 1. A feature point whose feature value is not zero indicates that a corresponding object is abnormal. For any feature point whose feature value is not zero, in response to that the feature value of the feature point is not less than a target threshold, the computer device adjusts the feature value of the feature point to 1. In response to that the feature value of the feature point is less than the target threshold, the computer device adjusts the feature value of the feature point to 0. Then, the computer device may adjust a size of the target channel image in which the feature value is adjusted, so that the size is the same as that of the first image, and obtain edge feature points of an image area whose feature values are 1 in the target channel image whose size is adjusted, to obtain the second image. That is, for the image area whose feature values are 1, the computer device may reserve only the edge area of the image area and set all other areas to be transparent, to obtain the second image. The target threshold may be 0.5, 0.65, 0.7, or the like. This is not limited in the embodiments of the present disclosure.

For example, the scaling ratio between the third feature image and the first image is 8, and the length and the width of the third feature image are both ⅛ of those of the first image. The computer device performs value adjustment on a positive value channel image in the third feature image to obtain an image with a pixel value of 0 or 1, and then magnifies the obtained image by 8 times according to the scaling ratio to obtain the second image. In the second image, an area with a pixel value of 1 indicates a possible location of a positive cell in the first image.

For the target channel image, the computer device may further remove an impurity area and an area that is less than a target size from the target channel image. The computer device may use an image area whose shape differs greatly from that of the nucleus as the impurity area. The computer may obtain the size of each continuous pixel value area according to continuity between pixels, and remove an image area whose size is less than the target size. Because the impurity area and the small image area are removed, the remaining image area includes large cells, such as positive cells or negative cells.

Figure 5:
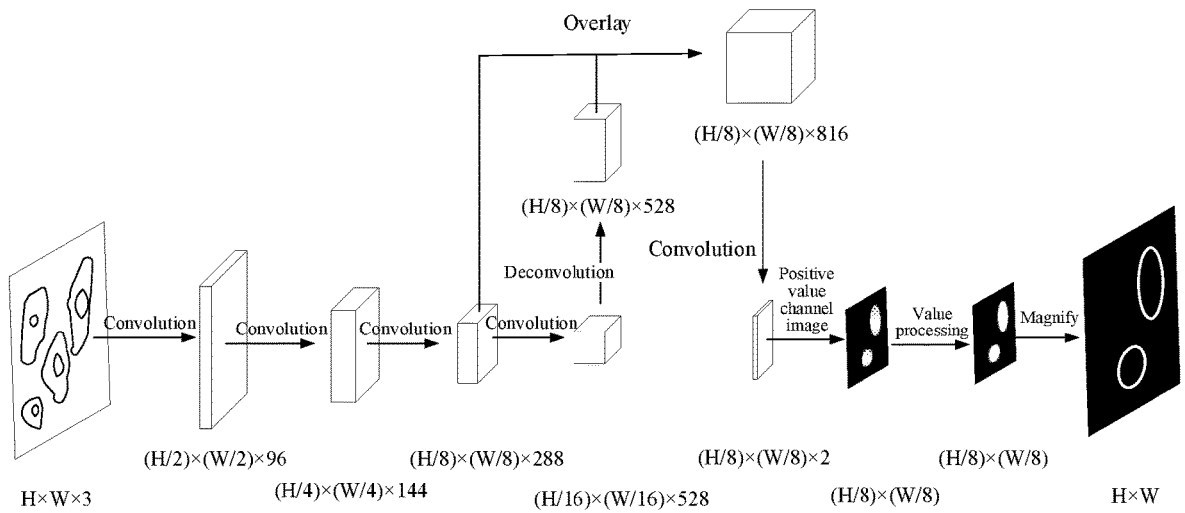
FIG. 5 is a flowchart of obtaining a second image according to an embodiment of the present disclosure.

To make the step of obtaining the second image by the computer device according to step 401 and step 405 clearer, refer to FIG. 5. FIG. 5 is a flowchart of obtaining a second image according to an embodiment of the present disclosure. As shown in FIG. 5, the first image includes three cells, that is, three to-be-tested objects. The height of the first image is H, the width of the first image is W, and the quantity of channels of the first image is 3. H and W are positive numbers greater than 0. The computer device performs convolution processing on the first image to obtain a feature image with a height H/2, a width W/2, and a quantity of channels 96. The computer device performs convolution processing on the obtained feature image again to obtain a feature image with a height H/4, a width W/4, and a quantity of channels 144. The computer device performs convolution processing on the obtained feature image to obtain a feature image with a height H/8, a width W/8, and a quantity of channels 288, where the feature image is the first feature image. The computer device performs convolution processing on the first feature image to obtain a fourth feature image with a height H/16, a width W/16, and a quantity of channels 528. The computer device performs deconvolution processing on the obtained fourth feature image to obtain a feature image with a height H/8, a width W/8, and a quantity of channels 528, where the feature image is the second feature image. The computer device overlays the first feature image and the second feature image to obtain a fifth feature image with a height H/8, a width W/8, and a quantity of channels 816, and then performs convolution processing on the fifth feature image to obtain a feature image with a height H/8, a width W/8, and a quantity of channels 2, where the feature image is the third feature image. The computer device obtains a positive value channel image in the third feature image, then performs value processing on the positive value channel image based on the target threshold, and finally magnifies the positive value channel image in which the feature value is adjusted to a size that is the same as that of the first image.

406. The computer device displays the second image superimposed on the first image.

In this embodiment of the present disclosure, after obtaining the second image, the computer device may project the second image to an optical path of the ocular lens of the microscope, that is, display both the first image and the second image in the ocular lens of the microscope. The second image is displayed by overlaying the second image on the first image, so that the location of an abnormal object such as the location of a positive cell in the first image can be indicated. This helps a medical practitioner to view.

Figure 6:
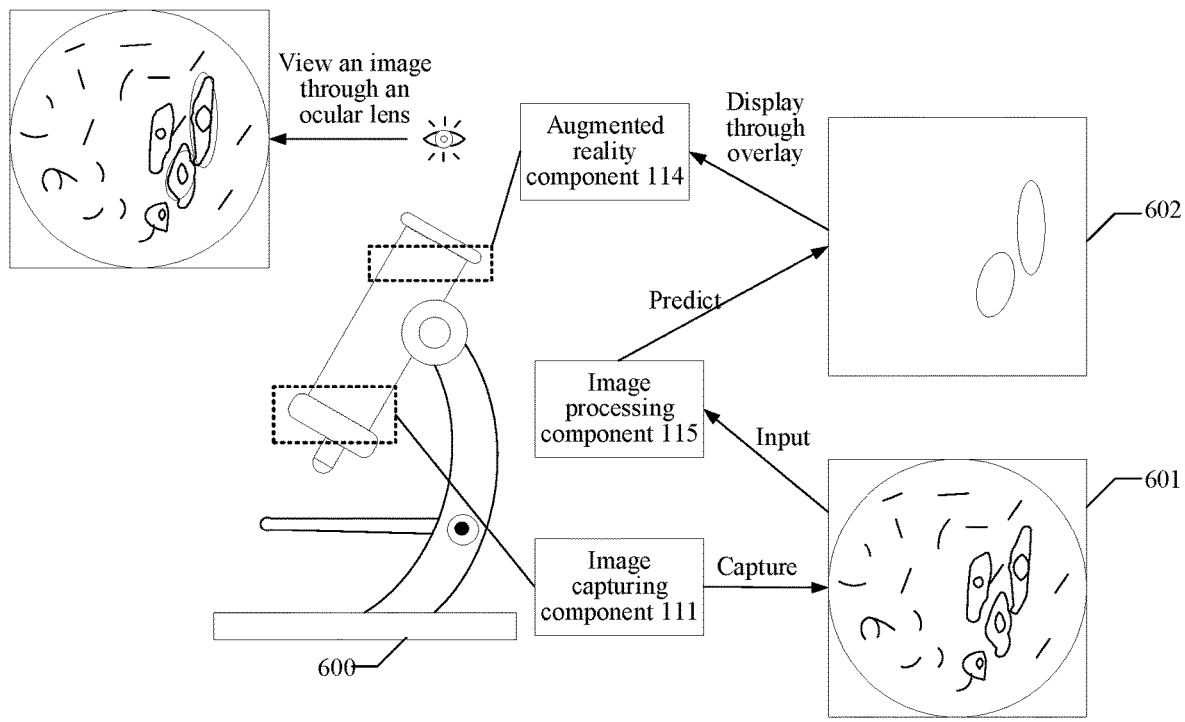
FIG. 6 is a schematic diagram of a microscope according to an embodiment of the present disclosure.

To make steps described in step 401 to step 406 clearer, refer to FIG. 6. FIG. 6 is a schematic diagram of a microscope according to an embodiment of the present disclosure. As shown in FIG. 6, the microscope is a computer device 600 integrated with multiple components, including an image capturing component 111, an image processing component 115, an augmented reality component 114, and the like. The image capturing component 111 is configured to capture a first image 601, the image processing component 115 is configured to process the first image to obtain a second image 602, and the augmented reality component 114 is configured to project the second image into an ocular lens 113, so that the ocular lens 113 displays the second image 602 by overlaying the second image 602 on the first image 601.

Figure 7:
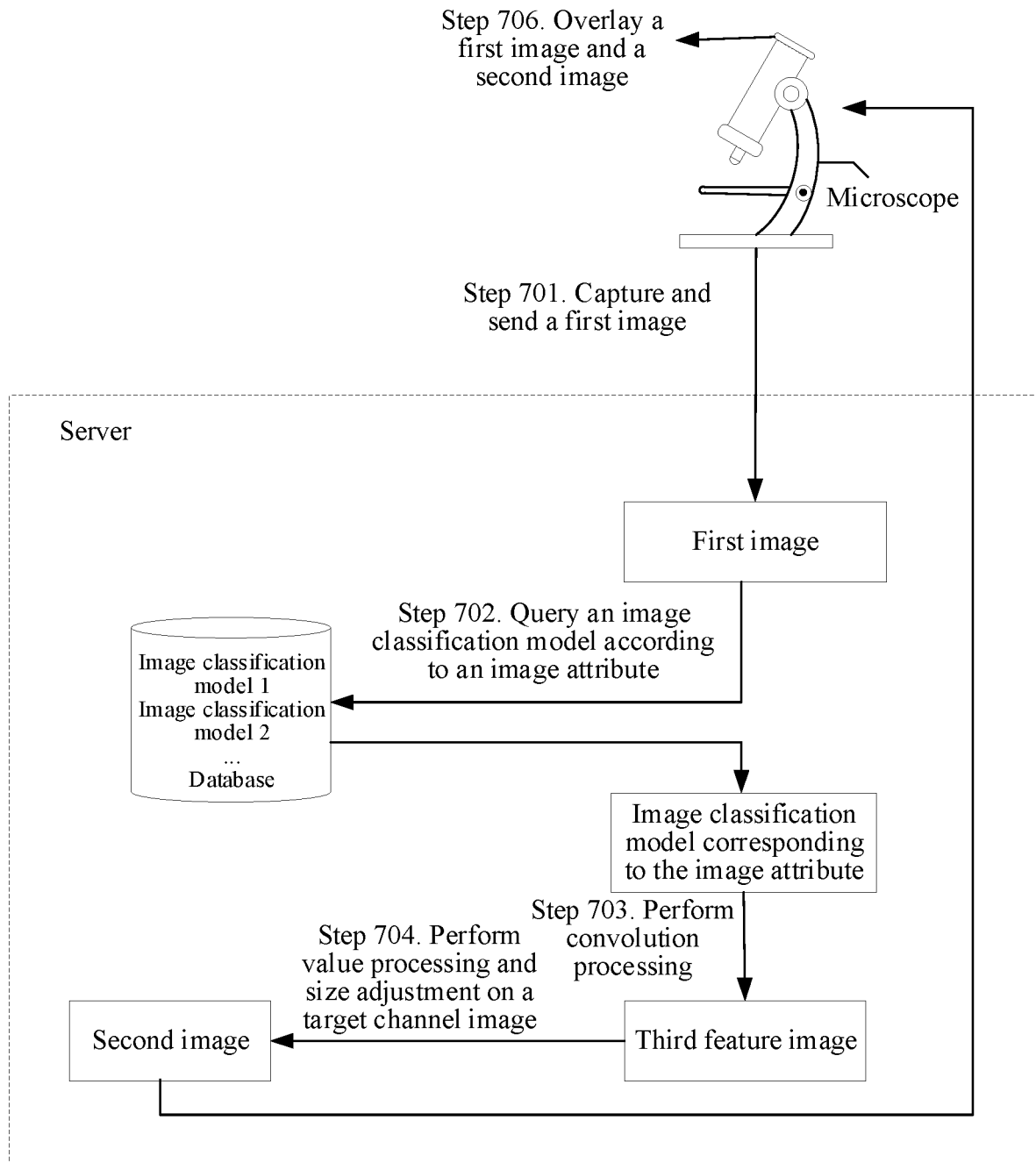
FIG. 7 is a flowchart of another image display method based on artificial intelligence according to an embodiment of the present disclosure.

Step 401 to step 406 are example embodiments of the image display method based on artificial intelligence provided in the embodiments of the present disclosure. In another embodiment, the method may be performed through interaction between multiple devices such as a microscope and a server. FIG. 7 is a flowchart of another image display method based on artificial intelligence according to an embodiment of the present disclosure. As shown in FIG. 7, the method includes the following steps: Step 701. The microscope captures a first image and sends the first image to the server. Step 702. The server queries a corresponding image classification model from a database according to an image attribute of the first image. Step 703. The server invokes the image processing model to perform convolution processing on the first image to obtain a third feature image. Step 704. The server performs value processing and size adjustment on a target channel image of the third feature image to obtain a second image. Step 705. The server returns the second image to the microscope. Step 706. The microscope displays the second image superimposed on the first image displayed in an ocular lens.

The computer device may further output the first image and the second image displayed through overlay to a display device for display through an image output interface. The display device may be a local display device or a remote display device. For example, the microscope may be provided with an electric stage. The electric stage is configured to adjust the location of the smear, to change the first image captured under current field of view of the microscope. The computer device may synchronously display and output the captured first image and second image. Alternatively, the computer device may send the first image and the second image to the remote end in the form of video streams. A medical practitioner at the remote end views the first image and the second image and makes a judgment. This may be applied to a remote consultation scenario.

In this embodiment of the present disclosure, the microscope captures an image of the local area of the smear, then the captured first image is processed based on the image classification model, the first feature image obtained through processing and the corresponding second feature image are overlaid, the third feature image in which a feature point indicates the possibility that a to-be-tested object is an abnormal object is outputted based on the image obtained after overlay, then the second image that indicates the location of the abnormal object in the first image is obtained based on the third feature image, and finally the second image is displayed by overlaying the second image on the first image. In this way, when interpreting the smear, the medical practitioner may make a judgment in real time when the local area of the smear includes the abnormal object. The medical practitioner does not need to confirm again. This shortens the working procedure of the medical practitioner and improves screening efficiency.

Figure 8:
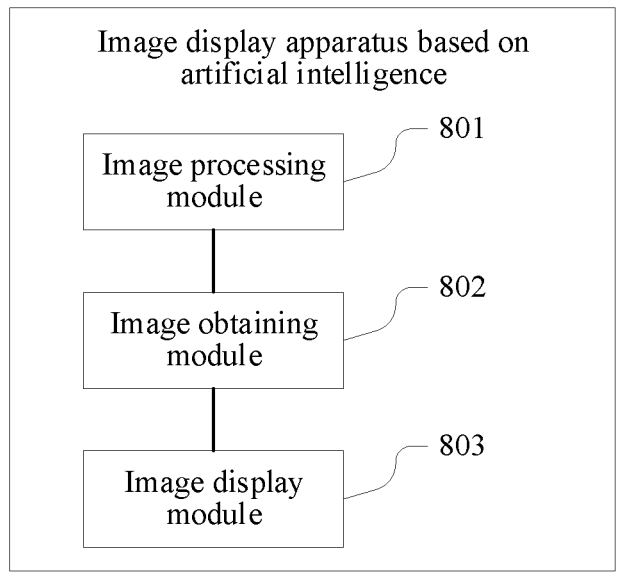
FIG. 8 is a block diagram of an image display apparatus based on artificial intelligence according to an embodiment of the present disclosure.

FIG. 8 is a block diagram of an image display apparatus based on artificial intelligence according to an embodiment of the present disclosure. The apparatus is configured to perform the steps of the image display method based on artificial intelligence. Referring to FIG. 8, the apparatus includes: an image processing module 801, an image obtaining module 802, and an image display module 803.

The image processing module 801 is configured to process a first image to obtain a first feature image, the first image being an image obtained by capturing an image of a local area of a smear including multiple to-be-tested objects through a microscope.

The image processing module 801 is further configured to obtain a second feature image corresponding to the first feature image, the second feature image and the first feature image having the same size.

The image processing module 801 is further configured to obtain a third feature image according to an image obtained by overlaying the first feature image and the second feature image, a feature point in the third feature image indicating a possibility that one of the multiple objects to be tested is an abnormal object.

The image obtaining module 802 is configured to obtain a second image according to the third feature image, the second image indicating a location of an abnormal object in the first image.

The image display module 803 is configured to display the second image superimposed on the first image.

In one embodiment, the image processing module 801 is further configured to: perform convolution processing on the first feature image, to obtain a fourth feature image; and perform deconvolution processing on the fourth feature image, to obtain the second feature image corresponding to the first feature image.

In one embodiment, the image processing module 801 is further configured to: overlay the first feature image and the second feature image, to obtain a fifth feature image, where the fifth feature image and the first feature image have the same size, and channels of the fifth feature image include channels of the first feature image and channels of the second feature image; and perform convolution processing on the fifth feature image, to obtain the third feature image.

In one embodiment, the third feature image is a two-channel image; and the image processing module 801 is further configured to: obtain a target channel image in the third feature image, where in the target channel image, a feature point whose feature value is not zero indicates that a corresponding object is abnormal; for any feature point in the target channel image whose feature value is not zero, in response to that the feature value of the feature point is not less than a target threshold, adjust the feature value of the feature point to 1; in response to that the feature value of the feature point is less than the target threshold, adjust the feature value of the feature point to 0; adjust a size of the target channel image in which the feature value is adjusted, so that the size is the same as that of the first image; and obtain edge feature points of an image area whose feature values are 1 in the target channel image whose size is adjusted, to obtain the second image.

In one embodiment, the image processing module 801 is further configured to remove an impurity area and an area that is less than a target size from the target channel image.

In one embodiment, the processes of processing a first image, obtaining a second feature image, and obtaining a third feature image according to an image obtained by overlaying the first feature image and the second feature image are implemented based on an image classification model.

In one embodiment, the apparatus further includes:
an image obtaining module 802, configured to obtain the first image;
a first determining module, configured to obtain a pathological analysis type of the first image according to an image attribute of the first image; and
a model invoking module, configured to invoke the image classification model corresponding to the pathological analysis type.

In one embodiment, the image attribute includes a target magnification power used for capturing the first image; and the model invoking module is further configured to: obtain, according to the pathological analysis type, at least one candidate image classification model corresponding to the pathological analysis type; and in response to that a sample image magnification power used to train a first candidate image classification model is the same as the target magnification power, use the first candidate image classification model as the image classification model.

In one embodiment, the apparatus further includes a model training module, configured to: obtain a training sample image, and obtain a training target image according to the training sample image, where the training sample image is an image in which a location of an abnormal object is marked, and the training target image is a binary image and is used to indicate the abnormal object; input the training sample image to an image classification model to be trained, to obtain a first sample feature image outputted by the to-be-trained image classification model; perform parameter adjustment according to the first sample feature image and the training target image; and in response to that a training end condition is satisfied, use a model obtained through training as the image classification model.

In one embodiment, the apparatus further includes:
a second determining module, configured to obtain a target size according to an image attribute of the training sample image, where the target size is used to indicate an actual size represented by a pixel in the training sample image;
the second determining module is further configured to obtain a target scaling ratio according to the target size and a reference cell size, where the target scaling ratio is used to indicate a ratio between the first sample feature image and the training sample image; and the second determining module is further configured to obtain a quantity of convolution layers of the image classification model according to the target scaling ratio.

In one embodiment, the second determining module is further configured to: according to the image attribute of the training sample image, obtain a sample magnification power used when the training sample image is captured and a pixel size that exists when the training sample image is captured; and obtain the target size according to the sample magnification power and the pixel size.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In this embodiment of the present disclosure, the image capturing module of the microscope captures an image of the local area of the smear, then the image processing module processes the captured first image, overlays the first feature image obtained through processing and the corresponding second feature image, outputs the third feature image in which a feature point indicates the possibility that a to-be-tested object is an abnormal object based on the image obtained after overlay, and then obtains the second image that indicates the location of the abnormal object in the first image based on the third feature image, and finally the image display module displays the second image superimposed on the first image. In this way, when interpreting the smear, the medical practitioner may make a judgment in real time when the local area of the smear includes the abnormal object. The medical practitioner does not need to confirm again. This shortens the working procedure of the medical practitioner and improves screening efficiency.

When the image display apparatus based on artificial intelligence provided in the above embodiments runs an application program, only division of the above functional modules is used as an example. In practical applications, the above functions can be allocated to different functional modules for implementation according to the requirement, that is, the internal structure of the apparatus is divided into different functional modules, to perform all or some of the functions described above. In addition, the embodiments of the image display apparatus based on artificial intelligence and the image display method based on artificial intelligence provided in the above embodiments belong to the same concept. For the specific implementation process, refer to the method embodiments. Details are not described herein again.

An embodiment of the present application further provides a computer device. The computer device may vary greatly due to different configurations or performance, and may include one or more central processing units (CPU) and one or more memories. At least one computer program is stored in the memory. The at least one computer program is loaded and executed by the processor to perform the following steps: processing a first image to obtain a first feature image, the first image being an image obtained by capturing an image of a local area of a smear including multiple to-be-tested objects through a microscope; obtaining a second feature image corresponding to the first feature image, the second feature image and the first feature image having the same size; obtaining a third feature image according to an image obtained by overlaying the first feature image and the second feature image, a feature point in the third feature image indicating a possibility that one of the multiple objects to be tested is an abnormal object; obtaining a second image according to the third feature image, the second image indicating a location of an abnormal object in the first image; and displaying the second image superimposed on the first image.

In some embodiments, the at least one computer program is loaded by the processor to specifically perform the following steps: performing convolution processing on the first feature image, to obtain a fourth feature image; and performing deconvolution processing on the fourth feature image, to obtain the second feature image corresponding to the first feature image.

In some embodiments, the at least one computer program is loaded by the processor to specifically perform the following steps: overlaying the first feature image and the second feature image, to obtain a fifth feature image, where the fifth feature image and the first feature image have the same size, and channels of the fifth feature image include channels of the first feature image and channels of the second feature image; and performing convolution processing on the fifth feature image, to obtain the third feature image.

In some embodiments, the third feature image is a two-channel image; and the at least one computer program is loaded by the processor to specifically perform the following steps: obtaining a target channel image in the third feature image, where in the target channel image, a feature point whose feature value is not zero indicates that a corresponding object is abnormal; for any feature point in the target channel image whose feature value is not zero, in response to that the feature value of the feature point is not less than a target threshold, adjusting the feature value of the feature point to 1; in response to that the feature value of the feature point is less than the target threshold, adjusting the feature value of the feature point to 0; adjusting a size of the target channel image in which the feature value is adjusted, so that the size is the same as that of the first image; and obtaining edge feature points of an image area whose feature values are 1 in the target channel image whose size is adjusted, to obtain the second image.

In some embodiments, the at least one computer program is further loaded by the processor to perform the following step: removing an impurity area and an area that is less than a target size from the target channel image.

In some embodiments, the at least one computer program is further loaded by the processor to perform the following steps: obtaining the first image; and obtaining a pathological analysis type of the first image according to an image attribute of the first image; and invoking the image classification model corresponding to the pathological analysis type.

In some embodiments, the image attribute includes a target magnification power used for capturing the first image; and the at least one computer program is loaded by the processor to specifically perform the following steps: obtaining, according to the pathological analysis type, at least one candidate image classification model corresponding to the pathological analysis type; and in response to that a sample image magnification power used to train a first candidate image classification model is the same as the target magnification power, using the first candidate image classification model as the image classification model.

In some embodiments, the image classification model is obtained through training in the following steps: obtaining a training sample image, and obtaining a training target image according to the training sample image, where the training sample image is an image in which a location of an abnormal object is marked, and the training target image is a binary image and is used to indicate the abnormal object; inputting the training sample image to an image classification model to be trained, to obtain a first sample feature image outputted by the to-be-trained image classification model; performing parameter adjustment according to the first sample feature image and the training target image; and in response to that a training end condition is satisfied, using a model obtained through training as the image classification model.

In some embodiments, the at least one computer program is further loaded by the processor to perform the following steps: obtaining a target size according to an image attribute of the training sample image, where the target size is used to indicate an actual size represented by a pixel in the training sample image; obtaining a target scaling ratio according to the target size and a reference cell size, where the target scaling ratio is used to indicate a ratio between the first sample feature image and the training sample image; and obtaining a quantity of convolution layers of the image classification model according to the target scaling ratio.

In some embodiments, the at least one computer program is loaded by the processor to specifically perform the following steps: according to the image attribute of the training sample image, obtaining a sample magnification power used when the training sample image is captured and a pixel size that exists when the training sample image is captured; and obtaining the target size according to the sample magnification power and the pixel size.

Certainly, the server may also include other components for implementing functions of the device. Details are not described herein.

Figure 9:
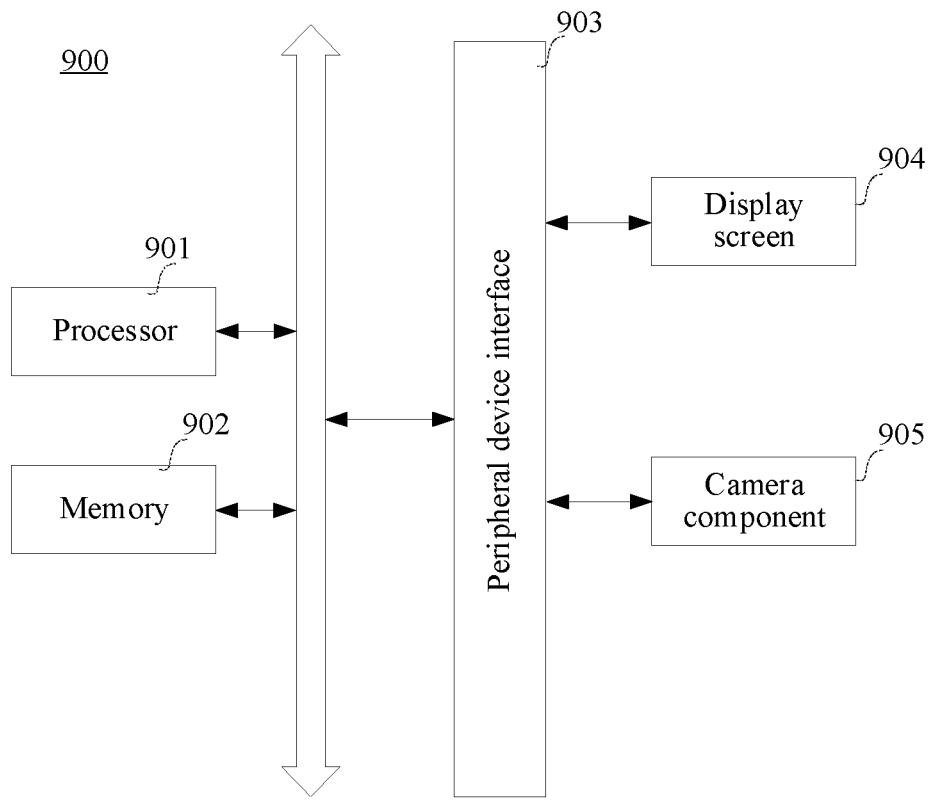
FIG. 9 is a structural block diagram of a computer device according to an embodiment of the present disclosure.

The computer device may be a terminal, and the terminal is described below. FIG. 9 is a structural block diagram of a computer device 900 according to an embodiment of the present disclosure. FIG. 9 is a structural block diagram of the computer device 900 according to an exemplary embodiment of the present disclosure. The computer device 900 may be: a smartphone, a tablet computer, a notebook computer, or a desktop computer. The computer device 900 may also be referred to as user equipment (UE), a portable computer device, a laptop computer device, a desktop computer device, or another name.

Generally, the computer device 900 includes a processor 901 and a memory 902.

The processor 901 may include one or more processing cores such as a 4-core processor or an 8-core processor. In some embodiments, the processor 901 may be integrated with a graphics processing unit (GPU). The GPU is configured to render and draw content that needs to be displayed on a display. In some embodiments, the processor 901 may further include an AI processor. The AI processor is configured to process a computing operation related to machine learning.

The memory 902 may include one or more computer-readable storage media that may be non-transitory. In some embodiments, a non-transitory computer-readable storage medium in the memory 902 is configured to store at least one computer program. The at least one computer program is executed by the processor 901 to implement the image display method based on artificial intelligence provided in the method embodiments of the present disclosure.

In some embodiments, the computer device 900 may further include a peripheral interface 903 and at least one peripheral. The processor 901, the memory 902, and the peripheral device interface 903 may be connected by using a bus or a signal cable. Each peripheral may be connected to the peripheral interface 903 by using a bus, a signal cable, or a circuit board. In some embodiments, the peripheral device includes: at least one of a display screen 904 and a camera component 905. The peripheral interface 903 may be configured to connect the at least one peripheral related to Input/Output (I/O) to the processor 901 and the memory 902. The display screen 904 is configured to display a captured image or video. The camera component 905 is configured to acquire images or videos.

A person skilled in the art may understand that the structure shown in FIG. 9 does not constitute any limitation on the computer device 900, and the computer device may include more components or fewer components than those shown in the figure, or some components may be combined, or a different component deployment may be used.

Figure 10:
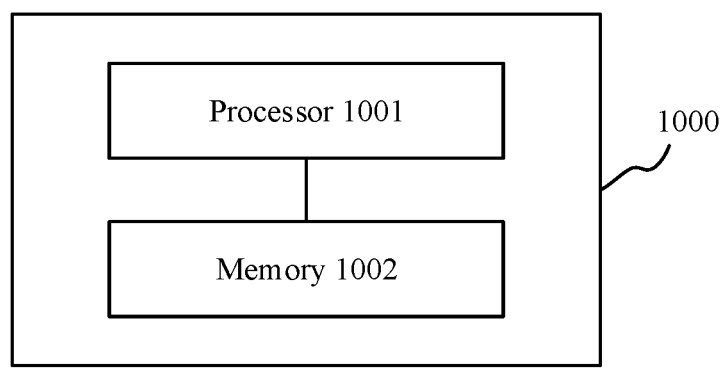
FIG. 10 is a schematic structural diagram of a server according to an embodiment of the present disclosure.

The computer device may be a server, and the server is described below. FIG. 10 is a schematic structural diagram of a server according to an embodiment of the present disclosure. The server 1000 may vary greatly due to different configurations or performance, and may include one or more processors (for example, central processing units, CPU) 1001 and one or more memories 1002. The memory 1002 stores at least one computer program, and the at least one computer program is loaded and executed by the processor 1001 to perform the image display method based on artificial intelligence according to the foregoing method embodiments. Certainly, the device can also have a wired or wireless network interface, a keyboard, an I/O interface and other components to facilitate I/O. The device can also include other components for implementing device functions. Details are not described herein again.

An embodiment of the present application further provides a computer-readable storage medium, where the computer-readable storage medium is applied to a computer device. The computer-readable storage medium stores at least one computer program, and the at least one computer program is executed by the processor to perform operations of the image display method based on artificial intelligence performed by the computer device according to the embodiments of the present application.

What is claimed is:

1. An image display method based on artificial intelligence, executed by a computer device, the method comprising:
    processing a first image to obtain a first feature image, the first image being an image of a local area of a smear captured by a microscope, and the local area comprising multiple objects to be tested;
    obtaining a second feature image corresponding to the first feature image, comprising:
        performing convolution processing on the first feature image, to obtain a fourth feature image; and
        performing deconvolution processing on the fourth feature image, to obtain the second feature image corresponding to the first feature image, the second feature image and the first feature image having a same size;
    obtaining a third feature image according to an image obtained by overlaying the first feature image and the second feature image, a feature point in the third feature image indicating a possibility that one of the multiple objects is an abnormal object;

obtaining a second image according to the third feature image, the second image indicating a location of an abnormal object in the first image; and displaying the second image superimposed on the first image.

2. The method according to claim 1, wherein the image obtained by overlaying the first feature image and the second feature image is a fifth feature image that has the same size as the first feature image, and channels of the fifth feature image comprise channels of the first feature image and channels of the second feature image; and the third feature image is obtained by performing convolution processing on the fifth feature image.

3. The method according to claim 1, wherein the third feature image is a multi-channel image; and the obtaining a second image according to the third feature image comprises:

obtaining a target channel image in the third feature image, wherein in the target channel image, a feature point whose feature value is not zero indicates that a corresponding object is abnormal;

for a feature point in the target channel image whose feature value is not zero, in response to that the feature value of the feature point is not less than a target threshold, adjusting the feature value of the feature point to a first value; in response to that the feature value of the feature point is less than the target threshold, adjusting the feature value of the feature point to a second value;

adjusting a size of the target channel image after adjusting the feature values to be the same as the size of the first image; and obtaining edge feature points of an image area whose feature values are the first value in the target channel image whose size is adjusted, to obtain the second image.

4. The method according to claim 3, wherein after the obtaining a target channel image in the third feature image, the method further comprises:

removing an impurity area and an area that is less than a target size from the target channel image.

5. The method according to claim 1, wherein the processes of processing a first image, obtaining a second feature image, and obtaining a third feature image according to an image obtained by overlaying the first feature image and the second feature image are implemented based on an image classification model; and before the processing a first image to obtain a first feature image, the method further comprises:

obtaining the first image;

obtaining a pathological analysis type of the first image according to an image attribute of the first image; and invoking the image classification model corresponding to the pathological analysis type.

6. The method according to claim 5, wherein the image attribute includes a target magnification power used for capturing the first image; and the invoking the image classification model corresponding to the pathological analysis type comprises:

obtaining at least one candidate image classification model corresponding to the pathological analysis type; and in response to that a sample image magnification power used to train a first candidate image classification model is the same as the target magnification power, using the first candidate image classification model as the image classification model.

7. The method according to claim 1, further comprising: training the image classification model, comprising:

obtaining a training sample image, and obtaining a training target image according to the training sample image, wherein the training sample image is an image in which a location of an abnormal object is marked, and the training target image is a binary image and is used to indicate the abnormal object;

inputting the training sample image to an image classification model to be trained, to obtain a first sample feature image outputted by the image classification model to be trained;

performing parameter adjustment according to the first sample feature image and the training target image; and in response to that a training end condition is satisfied, using a model obtained through training as the image classification model.

8. The method according to claim 7, wherein before the inputting the training sample image to an image classification model to be trained, the method further comprises:

obtaining a target size according to an image attribute of the training sample image, wherein the target size indicates an actual size represented by a pixel in the training sample image;

obtaining a target scaling ratio according to the target size and a reference cell size, wherein the target scaling ratio indicates a ratio between the first sample feature image and the training sample image; and obtaining a quantity of convolution layers of the image classification model according to the target scaling ratio.

9. The method according to claim 8, wherein the obtaining a target size according to an image attribute of the training sample image comprises:

according to the image attribute of the training sample image, obtaining a sample magnification power used when the training sample image is captured and a pixel size that exists when the training sample image is captured; and obtaining the target size according to the sample magnification power and the pixel size.

10. An image display apparatus based on artificial intelligence, comprising: at least one memory and at least one processor coupled to the memory, the at least one processor being configured to perform:

processing a first image to obtain a first feature image, the first image being an image of a local area of a smear captured by a microscope, and the local area comprising multiple objects to be tested;

obtaining a second feature image corresponding to the first feature image, comprising:

performing convolution processing on the first feature image, to obtain a fourth feature image; and performing deconvolution processing on the fourth feature image, to obtain the second feature image corresponding to the first feature image, the second feature image and the first feature image having a same size;

obtaining a third feature image according to an image obtained by overlaying the first feature image and the second feature image, a feature point in the third feature image indicating a possibility that one of the multiple objects to be tested is an abnormal object;

obtaining a second image according to the third feature image, the second image indicating a location of an abnormal object in the first image; and displaying the second image superimposed on the first image.

11. The apparatus according to claim 10, wherein the image obtained by overlaying the first feature image and the second feature image is a fifth feature image that has the same size as the first feature image, and channels of the fifth feature image comprise channels of the first feature image and channels of the second feature image; and the third feature image is obtained by performing convolution processing on the fifth feature image.

12. The apparatus according to claim 10, wherein the third feature image is a multi-channel image; and the obtaining a second image according to the third feature image comprises:

obtaining a target channel image in the third feature image, wherein in the target channel image, a feature point whose feature value is not zero indicates that a corresponding object is abnormal;

for a feature point in the target channel image whose feature value is not zero, in response to that the feature value of the feature point is not less than a target threshold, adjusting the feature value of the feature point to 1; in response to that the feature value of the feature point is less than the target threshold, adjusting the feature value of the feature point to 0;

adjusting a size of the target channel image after adjusting the feature values to be the same as the size of the first image; and obtaining edge feature points of an image area whose feature values are 1 in the target channel image whose size is adjusted, to obtain the second image.

13. The apparatus according to claim 12, wherein after the obtaining a target channel image in the third feature image, the method further comprises:

removing an impurity area and an area that is less than a target size from the target channel image.

14. The apparatus according to claim 10, wherein the processes of processing a first image, obtaining a second feature image, and obtaining a third feature image according to an image obtained by overlaying the first feature image and the second feature image are implemented based on an image classification model; and before the processing a first image to obtain a first feature image, the method further comprises:

obtaining the first image;

obtaining a pathological analysis type of the first image according to an image attribute of the first image; and invoking the image classification model corresponding to the pathological analysis type.

15. The apparatus according to claim 14, wherein the image attribute includes a target magnification power used for capturing the first image; and the invoking the image classification model corresponding to the pathological analysis type comprises:

obtaining at least one candidate image classification model corresponding to the pathological analysis type; and in response to that a sample image magnification power used to train a first candidate image classification model is the same as the target magnification power, using the first candidate image classification model as the image classification model.

16. The apparatus according to claim 10, wherein the image classification model is trained by:

obtaining a training sample image, and obtaining a training target image according to the training sample image, wherein the training sample image is an image in which a location of an abnormal object is marked, and the training target image is a binary image and is used to indicate the abnormal object;

inputting the training sample image to an image classification model to be trained, to obtain a first sample feature image outputted by the image classification model to be trained;

performing parameter adjustment according to the first sample feature image and the training target image; and in response to that a training end condition is satisfied, using a model obtained through training as the image classification model.

17. The apparatus according to claim 16, wherein before the inputting the training sample image to an image classification model to be trained, the processor is further configured to perform:

obtaining a target size according to an image attribute of the training sample image, wherein the target size indicates an actual size represented by a pixel in the training sample image;

obtaining a target scaling ratio according to the target size and a reference cell size, wherein the target scaling ratio indicates a ratio between the first sample feature image and the training sample image; and obtaining a quantity of convolution layers of the image classification model according to the target scaling ratio.

18. An image display system based on artificial intelligence, comprising:

an objective lens configured to magnify a local area of a smear, the local area comprising multiple objects to be tested;

an image capturing component connected to the objective lens and configured to capture a first image through a microscope, the first image being an image of the local area of the smear;

an image processing component connected to the image capturing component and configured to:

process the first image, to obtain a first feature image;

obtain a second feature image corresponding to the first feature image, comprising:

performing convolution processing on the first feature image, to obtain a fourth feature image; and performing deconvolution processing on the fourth feature image, to obtain the second feature image corresponding to the first feature image, the second feature image and the first feature image having a same size;

obtain a third feature image according to an image obtained by overlaying the first feature image and the second feature image, a feature point in the third feature image indicating a possibility that one of the multiple objects to be tested is an abnormal object; and obtain a second image according to the third feature image, the second image indicating a location of an abnormal object in the first image;

an ocular lens connected to the image capturing component and configured to display the first image; and an augmented reality component connected to the image processing component and configured to project the second image into the ocular lens, so that the ocular lens displays the second image superimposed on the first image.

* * * * *